(12) United States Patent
Kowalski et al.

(10) Patent No.: US 10,886,820 B2
(45) Date of Patent: Jan. 5, 2021

(54) ELECTRICAL MACHINE

(71) Applicant: Oswald Elektromotoren GmbH, Miltenberg (DE)

(72) Inventors: Thomas Kowalski, Mömbris (DE); Thomas Reis, Kleinheubach (DE); Johannes Teigelkötter, Aschaffenburg (DE); Johannes Oswald, Miltenberg (DE); Alexander Stock, Aschaffenburg (DE)

(73) Assignee: Oswald Elektromotoren GmbH, Miltenberg (DE)

(*) Notice: Subject to any disclaimer, the term of this patent is extended or adjusted under 35 U.S.C. 154(b) by 449 days.

(21) Appl. No.: 15/766,843

(22) PCT Filed: Oct. 10, 2016

(86) PCT No.: PCT/EP2016/074132
§ 371 (c)(1),
(2) Date: Jul. 5, 2018

(87) PCT Pub. No.: WO2017/060509
PCT Pub. Date: Apr. 13, 2017

(65) Prior Publication Data
US 2018/0331600 A1 Nov. 15, 2018

(30) Foreign Application Priority Data
Oct. 9, 2015 (DE) .......................... 10 2015 117 296

(51) Int. Cl.
*H02K 9/19* (2006.01)
*H02K 55/00* (2006.01)
(Continued)

(52) U.S. Cl.
CPC ................. *H02K 9/19* (2013.01); *H02K 5/20* (2013.01); *H02K 9/08* (2013.01); *H02K 11/33* (2016.01);
(Continued)

(58) Field of Classification Search
CPC .. H02K 9/16; H02K 9/19; H02K 9/18; H02K 9/197; H02K 9/20; H02K 9/06;
(Continued)

(56) References Cited

U.S. PATENT DOCUMENTS 5,625,548 A 4/1997 Gold et al.
5,965,959 A 10/1999 Gamble et al.
(Continued)

FOREIGN PATENT DOCUMENTS

DE 10120414 A1 10/2002
DE 10156212 A1 6/2003
(Continued)

*Primary Examiner* — Bryan R Perez
(74) *Attorney, Agent, or Firm* — Smartpat PLC

(57) ABSTRACT

The invention relates to an electric machine with a stator (1), with a rotor and with multiple machine coils (3). The electrical machine comprises a cooling device, which is suitable for cooling a superconducting material to at least below a transition temperature. Windings (4) of at least two machine coils (3) consist of the superconducting material and are assigned to different winding groups. The windings (4) are operatively connected with the cooling device, in order to cool the windings (4) to below the transition temperature. The electrical machine comprises an open-loop or closed-loop controlled power supply device, electrically conductively connected with the windings (4), for the supply of electrical power and controlling of the machine coils (2). At least two winding groups are each electrically-conductively connected with a separate, open-loop or closed-loop controlled power output stage (6) of the power supply device. The separate, open-loop or closed-loop controlled
(Continued)

power output stages (6) are arranged within the thermal insulation area (5) of the electric machine delimited by the thermal insulator.

19 Claims, 3 Drawing Sheets

(51) Int. Cl.
 *H02K 55/02* (2006.01)
 *H02K 11/33* (2016.01)
 *H02K 5/20* (2006.01)
 *H02K 9/08* (2006.01)

(52) U.S. Cl.
 CPC ............. *H02K 55/00* (2013.01); *H02K 55/02* (2013.01); *Y02E 40/60* (2013.01)

(58) Field of Classification Search
 CPC .. H02K 9/22; H02K 9/08; H02K 1/16; H02K 1/276; H02K 1/20; H02K 1/32; H02K 5/20; H02K 5/02; H02K 5/04; H02K 5/08; H02K 3/24; H02K 55/00; H02K 11/33; H02K 55/02; Y02E 40/622; Y02E 40/62

See application file for complete search history.

(56) References Cited

U.S. PATENT DOCUMENTS

| 2004/0119427 | A1 | 6/2004 | Stridsberg |
| 2004/0256922 | A1 | 12/2004 | Steinmeyer |
| 2012/0274161 | A1* | 11/2012 | Aizawa .................... H02K 9/16 310/55 |
| 2015/0194248 | A1 | 7/2015 | Holcomb |

FOREIGN PATENT DOCUMENTS

| DE | 102011056008 A1 | 6/2013 |
| DE | 102014114451 A1 | 4/2016 |
| JP | 2005224022 A | 8/2005 |
| WO | 2007036430 A1 | 4/2007 |
| WO | 2012127011 A3 | 5/2013 |
| WO | 2013102597 A3 | 3/2014 |
| WO | 20016055491 A3 | 7/2016 |

* cited by examiner

ELECTRICAL MACHINE

TECHNICAL FIELD

The present invention generally relates to an electric machine, and more particularly, to an electric machine with machine coils having windings made of superconductive material.

BACKGROUND

Electric machines, in which the rotor performs a rotary movement relative to the stationary stator, are used, in many different configurations, in a plurality of application fields, both as motors and as generators. For example, the electric machines can be operated with a three-phase current, and can be designed as asynchronous or synchronous machine.

Depending on the output provided for the electric machine, the electric machine can necessarily have a considerable weight and volume, whereby the manufacturing and assembly of the electric machine becomes complicated. Restrictions in the construction space or limitations in the weight can then lead to the conventional electric machine not being suitable as a drive.

For some uses, electric machines with very short rise times, or a quick, dynamic operating behavior are also required. For example, such electric machines are used as load-application devices for highly dynamic motor test benches. Conventional electric machines can often not, or only insufficiently meet the increasing requirements in this field.

Therefore, electric machines were developed, which comprise machine coils made of superconducting materials. Superconducting materials are materials, the electrical resistance of which when falling below a material-specific transition temperature suddenly drops to zero. If the windings of the machine coils, cooled to below the transition temperature, are, for example, applied with alternating current, only a small energy loss occurs, which is only very small relative to an ohmic resistance. Strong electromagnetic fields can thereby also be generated with comparatively small machines, whereby the power density of the electric machines significantly increases, and a high dynamic range is enabled.

The electric machine with a superconducting winding can, for example, be operated with a three-phase alternating current. However, it is also possible to operate the electric machine with a higher-phase alternating current. Here, the electric machine can be operated both in a lower rpm range and simultaneously high torque, as well as also in a so-called field weakening range, up to high speeds in a constant power supply.

As a superconducting material, high-temperature superconductors would be an option, whose transition temperature can already be reached at a temperature of minus 140 degrees Celsius. Superconducting materials could be employed for the winding of the machine coils, for example in the form of strips or wires. Among others, the compositions YBCO (YBCO coated conductor), BSCCO, MgB2 or pnictide can be considered as superconducting materials, which, in sufficiently low temperatures, can have an exceptionally high current density.

The machine coils can be arranged both on or in the rotor, as well as also on or in the stator. The stator can be arranged outside (as external rotor), or inside of the rotor (as internal rotor).

Such electric machines with superconducting windings are described in patent document DE 10 2011 056 008 A1 of the same applicant, the content of which is incorporated by reference in the present description. Comparable electric machines with an alternatively configured cooling of the superconducting windings are described in the publication, still outstanding at the time of the application, of the International Patent Application PCT/EP2015/073069, which claims the priority of the German patent application DE 10 2014 114 451.1. The contents of this patent application are also incorporated by reference in the present description.

In the known electric machines with superconducting windings, the windings are usually cooled through bath cryostats, in which the machine coils to be cooled are surrounded by a cryogenic liquid, for example by liquid nitrogen, or by a refrigerator cryostat, in which cooling is effected by means of a so-called cryo-cooler.

The open-loop or closed-loop controlled power supply device is usually a suitable frequency converter. Here, frequency converters are frequently used with a DC-voltage intermediate circuit fed via a rectifier, via which DC-voltage intermediate circuit a corresponding open-loop or closed-loop controlled inverter is supplied. The inverter, with the help of power-electronic switching elements—for example, in MOSFET, IGBT, or IGCT technology, provides the power required for the operation of the electric machine at a given frequency of the operating voltages. The inverters are therefore often also referred to as power output stage. The DC-voltage intermediate circuit and the power output stage can, for example, be connected with one another via electric cable lines.

For the open-loop or closed-loop control of the electric machine or the power output stage, the electric machines comprise corresponding control devices which, for example by detecting a load current used to operate the machine coil, or through a machine rpm and suitable set point values, provide the respectively desired power output of the electric machines. Corresponding methods for open-loop or closed-loop control of electric machines are, for example, described in the patent documents WO 2012/127011 A2 and WO 2013/102597 A2 of the same applicant, the contents of which are incorporated into the present description by reference.

SUMMARY

The invention relates to an electric machine with a stator, with a rotor and with multiple machine coils, wherein the electric machine comprises a cooling device, which is suitable for cooling a superconducting material to at least below a transition temperature, wherein windings of at least two machine coils consist of the superconducting material, and are assigned to different winding groups, wherein the windings are operatively connected with the cooling device, in order to cool the windings to below the transition temperature, and wherein the electric machine comprises an open-loop or closed-loop controlled power supply device, electrically-conductively connected with the windings, for the supply of electrical power and the control of the machine coils. The invention also relates to an electric machine with a stator, with a rotor, and with multiple machine coils, wherein the electric machine comprises a cooling device, which is suitable for cooling a superconducting material to at least below a transition temperature, wherein a winding of at least one machine coil consists of the superconductive material, wherein the winding is operatively connected with the cooling device, in order to cool the winding to below the transition temperature, and wherein the electric machine comprises an open-loop or closed-loop controlled power supply device, electrically-conductively connected with the windings, for the electric supply and controlling of the machine coil.

It is seen as the object of the invention to improve the supplying of the machine coils with electric energy via the power supply device. The object is achieved according to the invention by means of an electric machine with a stator, with a rotor, and with multiple machine coils, wherein the electric machine comprises a cooling device, which is suitable for cooling down a superconducting material to at least below a transition temperature, wherein windings of at least two machine coils consist of the superconducting material, and are assigned to different winding groups, wherein the windings are operatively connected with the cooling device, in order to cool the windings to below the transition temperature, and wherein the electric machine comprises an open-loop or closed-loop controlled power supply device, electrically-conductively connected with the windings, for the supply of electrical power and the control, and which is characterized in that at least to winding groups are each electrically-conductively connected with a separate, open-loop or closed-loop controlled power output stage of the power supply device. A winding group is understood as one or multiple windings, which are supplied with energy by a common power output stage.

By means of such a modular structure of the power supply device, in which multiple power output stages, and advantageously, a separate power output stage for each winding, are used, it is possible to arrange the power output stages particularly close to the machine coils or windings, and to reduce a required line length between the power output stages and the respective windings. In this manner, a more exact and faster detection of the respective load current is possible. A faster and more precise comparison of target current and actual current are also thereby possible, on the basis of which a monitoring of the machine coils can be effected.

For example, a negative deviation of the actual load current from the target load current can be interpreted as a so-called quench of the superconducting material of the winding, and the corresponding machine coil can be switched off or can be continued to be further operated with reduced load current for the protection purposes. According to the invention, a positive deviation can be interpreted as a short circuit of the monitored winding. These faults can, in the significantly-spaced arrangement of the power output stages known from prior art, usually not be recognized due to the missing ohmic portion. Through the modular structure, and the close arrangement of the power output stages to the machine coils made possible thereby, an effective protection for the superconducting machine coil system is therefore possible. In addition, a controlled operation of the machine coils can also be made possible within permitted coil parameters.

By means of the modular structure, also a higher fail safety of the electric machine can be achieved, as an operating of the electric machine remains possible, even in the case of failure or error of individual, or also multiple machine coils. As a result, the electric machine can in particular also come into use wherever particular requirements are required in terms of security. Therefore, the electric machine according to the invention is also above all suitable as an electric drive motor of a hybrid aircraft or of an electric aircraft.

According to the invention, it is advantageously provided for all machine coils or windings to be each electrically-conductively connected with a separate power output stage, and are supplied with electrical energy. In this fashion, a particularly high fail safety among other things, can be achieved.

The modular structure according to the invention of the electric machine is advantageously used for stationary machine coils of the stator of the electric machine. The other embodiments of the electric machine described in the following can also advantageously be used in such electric machines, in which the machine coils and the power output stages form a part of the stator. In these electric machines, the rotating part or the rotor of the electric machine is typically formed with superconductors, normal conductors or permanent magnets. According to the invention, the stationary part, or stator of the electric machine consists of machine coils, of which at least some comprise windings made of the superconducting material, as well as of the assigned power output stages, which are in operative connection with at least one machine coil or winding or winding group, respectively.

A close arrangement of a single power output stage on multiple machine coils can, according to the invention, also be achieved by an electric machine with a stator, with a rotor and with multiple machine coils, wherein the electric machine comprises a cooling device, which is suitable for cooling a superconducting material to at least below a transition temperature, wherein a winding of at least one machine coil consists of the superconducting material, wherein the winding is in operative connection with the cooling device, in order to cool the winding to below the transition temperature, and wherein the electric machine comprises an open-loop or closed-loop controlled power supply device electrically-conductively connected with the winding for the supplying of electric power and controlling of the machine, and which is characterized in that an open-loop or closed-loop controlled power output stage of the power supply device is arranged within a thermal insulation area of the electric machine formed by a thermal insulator, and is electrically-conductively connected with the winding of the least one machine coil.

The machine coil, or at least the windings, are advantageously arranged within a thermal insulator, in order to be able to decrease the cooling power necessary for the cooling. Arranging the power output stage within the thermal insulator as well allows reducing the distance to the windings, whereby some of the already described advantages can be achieved.

In order to link the advantages of the modular structure with the advantages of the arrangement of the power output stage in the thermal insulation area, it is provided according to the invention that the separate, open-loop or closed-loop controlled power output stages are arranged within the thermal insulation area of the electric machine formed by the thermal insulator.

Through the arrangement of the power output stage or the power output stages, a more efficient cooling of the power output stages to an operating temperature is also possible, which temperature can be set between room and cryogenic temperature. Feasible through the efficient cooling to comparatively lower operating temperatures achieved in this manner, the heat losses occurring in the power output stages can be efficiently dissipated, whereby a more compact and lighter overall construction of the electric machine is made possible. This, in turn, is the basis for obtaining a high power density of the electric machine, which is expedient in many uses, but also first makes possible some applications of the electric machine, such as for example in electrically-powered flying devices.

For open-loop or closed-loop control of the electric machine, and for activation of the windings, it is provided, according to the invention, that one or multiple control device(s) for the open-loop or closed-loop control of the power output stage or the power output stages is or are arranged within the thermal insulation area. Advantageously, every power output stage comprises a separate control device. With the help of the control device, the monitoring of the operating parameters of the windings is also advantageously performed. The open-loop or closed-loop control of the power output stages can occur via one or multiple control devices. In the use of multiple control devices, a comparison and a synchronization of the individual control devices can occur in a decentralized manner via the respective control devices, or also in a centralized manner via a master control device. The multiple control devices are advantageously connected with one another via a bus system.

Due to the fact that the control device or the control devices are likewise arranged within the thermal insulation area, a particularly rapid monitoring of the operating parameters and open-loop or closed-loop control of the machine coils is also possible, as especially short data-transmitting and electrically-conducting connections can be used, which permit a fast evaluation and activation.

Advantageously, it is provided according to the invention that, via the controller devices, the individual power output stages can be activated in such a way that all machine coils, or merely individual machine coils are used for operating the electric machine. In this manner, a power output of the electric machine can be adjusted to a required power.

For the cooling of machine coils or windings of the machine coils arranged within the thermal insulator or within the insulation area, it is provided, according to the invention, that the at least one machine coil, or at least the winding of the at least one machine coil is cooled via at least one refrigerant-carrying cooling pipe resting against the winding. In the use according to the invention of cooling pipes for the cooling of the winding and the therewith-associated direct linking of the respective cooling pipe to the respective winding, the cooling power is transmitted to the cryogenic liquid advantageously flowing through the cooling pipes in particular through heat conduction via the walls of the cooling pipes.

However, according to the invention, it is also possible that the at least one machine coil, or at least the winding of the at least one machine coil is arranged within a refrigeration space, wherein the thermal insulator surrounds the refrigeration space. Advantageously, it is provided for the winding to be arranged within a refrigeration space of a winding cryostat. The winding cryostat comprises a thermal insulator, which surrounds the refrigeration space. The thermal insulator can advantageously be a technical vacuum. Within the technical vacuum, the power output stage is arranged for the supply of electric power of the winding. The refrigeration space is advantageously flown-through by a cryogenic liquid, so that the winding cryostat is a variant of a bath cryostat.

Advantageously, it is provided according to the invention for the at least on machine coil, or at least for the winding of the at least one machine coil to be cooled by at least one bath cryostat or by at least one refrigerator cryostat, wherein the at least one machine coil, or at least the winding of the at least one machine coil is arranged within the refrigeration space of the bath cryostat or the refrigerator cryostat. In order to avoid an unneeded warming up, via the power electronics, of the cryogenic liquid before the cooling of the windings, it is advantageously provided for the power electronics to be arranged outside of the refrigeration space. In the use of a refrigeration space, the power output stage should advantageously also be arranged outside of the refrigeration space, as the cryogenic temperature of the cryogenic liquid required for the cooling of the windings arranged in the refrigeration space could damage the power electronics.

In a particularly advantageous configuration of the electric machine according to the invention, it is provided that a vacuum can be generated within the thermal insulation area. Through a vacuum, a particularly good thermal insulation of the windings and the power output staged is achieved. Advantageously, the machine coils and the power output stages are arranged between vacuum tubes arranged coaxially to one another, which are closed through lids, and between which a vacuum, or a technical vacuum can be generated. In the center of the vacuum tubes, with smaller dimeter, the rotor is advantageously arranged. The vacuum tubes and the lids form a vacuum chamber.

Advantageously, it is provided according to the invention, that a power supply line length of a superconducting electrical connection of the winding with the respective power output stage maximally amounts to 10 cm. Through the, in this fashion, comparatively short configuration of the superconducting electric connection, this can be produced more simply and cost-effectively.

Advantageously, it is provided according to the invention that the power output stage is electrically-conductively connected with a DC voltage intermediate circuit arranged at a distance to the power output stage, and is supplied with energy, or that the multiple power output stages are electrically-conductively connected with a DC voltage intermediate circuit arranged at a distance to the power output stage, and are supplied with electrical energy. The modular power output stages are advantageously supplied with electrical energy via a common DC voltage intermediate circuit. The power supply line lengths of the superconducting electrical connections, as well as of the normally-conducting electrical connections between the power output stages and the superconducting electrical connections can each be configured to be comparatively short. For operation-related reasons, a power feed from the DC voltage intermediate circuit to the power output stages is executable by using smaller line cross-sections than the connection between the power output stages and the individual windings, as merely the actually consumed power must be conducted, via the electrical lines, from the DC voltage intermediate circuit to the power output stages, while the apparent power supply must additionally also be conducted, via the electrical lines, between the power output stages and the windings. Through the modular design and the spatially-separated arrangement of the power output stages and the DC voltage intermediate circuit, in particular the superconducting electrical connections can therefore be produced more simply and cost-effectively.

Advantageously, it is provided according to the invention, that the DC voltage intermediate circuit is arranged outside of the thermal insulation area. The thermal insulator, or the thermal insulation area is advantageously formed by means of a vacuum. The electric power supplied to the power output stages and the windings must also be led through the thermal insulator and, when using a vacuum, through the formed vacuum from the environment. Besides a thermal input, by heating the electric conductors within the thermal insulator, which insulator, in turn, must be cooled down again, the sealing between the feed lines to the power output stages and a vacuum chamber, formed for example via vacuum tubes is elaborate when using a vacuum. Insofar as the power output stages are supplied via a common DC voltage intermediate circuit arranged outside of the thermal insulation area, merely two terminals are necessary, however, which must be led through the vacuum chamber and the thermal insulator. The effort for sealing the vacuum area is thereby considerably reduced, as, for example, at least three feed lines would be required for a three-phased connection. In this manner, the thermal input into the cooling system is reduced, as well as also the mechanical effort for the vacuum feedthroughs is simplified.

In order to further reduce the number of the required line feedthroughs through the vacuum chamber and the thermal insulator, it is provided, according to the invention, that the power output stage or the power output stages and the control device or control devices are arranged within the thermal insulation area, so that merely two electrical feed lines have to be guided from the DC voltage intermediate circuit through the thermal insulation.

In a particularly advantageous configuration of the invention, it is provided for the electrical feed lines to be guided through cooling medium pipes of the cooling device, via which the cooling device is supplied with cryogenic cooling liquid. In this manner, no additional passage through the thermal insulator and, for example, the vacuum chamber surrounding a vacuum is necessary. Advantageously, the feed lines are guided through a cooling medium return pipe, in order to not unnecessarily warm up the cooling medium before the cooling of the windings, and in order to be able to reliably provide the required cooling power for cooling the windings to below the transition temperature.

Advantageously, it is provided according to the invention that the power output stages are configured such that the power output stages each can provide an output voltage with a frequency of at least 4 kHz. High clock frequencies of the power output stages enable a better smoothness or shaping of the power and voltage curves used for controlling the windings, whereby losses in the superconducting windings can be reduced. Through the modular design, electric machines can be provided with power outputs of multiple megawatts of power, wherein, however, the individual power output stages must have a comparatively low output current of preferably maximum 1 kA. Through the low required power output of the individual power output stages, particularly high clock frequencies can be achieved.

In order to be able to cool down the power output stages to a preset operating temperature, it is provided according to the invention that the power output stage or the power output stages are connected with the cooling device, and can be cooled to a preset operating temperature between an ambient temperature of the electric machine and the transition temperature. In this manner, it can be achieved that the power output stages are cooled to an operating temperature between the transition temperature of the superconductors and the ambient temperature so that a heat input from the power output stages to machine coils is minimized, the power output stages are operated in optimal operating ranges, and the thermal losses of the power output stages can be dissipated without additional cooling devices.

Advantageously, it is provided according to the invention that the power output stage or the power output stages each are connected with cooling pipes of the windings via cooling medium connecting lines, wherein cooling medium is guided from the cooling device to the cooling pipes of the windings, and the cooling medium is subsequently guided, via the cooling medium connecting lines, to the power output stage or to the power output stages. In this manner, thermal losses of the power output stages can simply be dissipated via the further used cooling medium.

Advantageously, it is provided according to the invention that the machine coils and the power output stages form a part of the stator.

Further advantageous configurations of the electric machine according to the invention are further explained with the help of the exemplary embodiments represented in the drawing.

DETAILED DESCRIPTION

Figure 1:
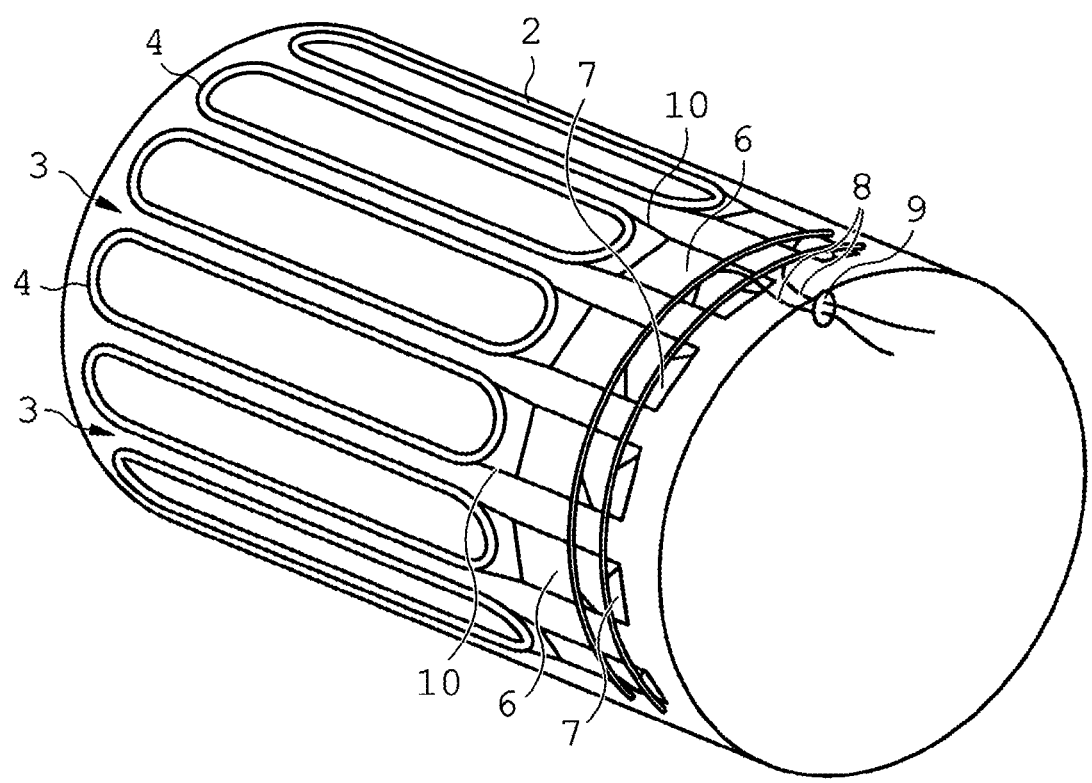
FIG. 1 a sectional, schematically represented view of a stator 1 of an electric machine, FIG. 2 a sectional, schematically represented arrangement of multiple machine coils and power output stages arranged within a thermal insulator, and FIG. 3 a sectional, schematically represented arrangement of multiple machine coils arranged within a refrigeration space surrounded by a thermal insulator.

FIG. 1 shows a sectional, schematically represented view of a stator 1 of an electric machine. The stator 1 comprises multiple machine coils 3, arranged concentrically around a vacuum tube 2, which machine coils in turn comprise windings 4 made of a superconducting material. In a thermal insulation area 5 between the vacuum tube 2 and a further, not represented, coaxially arranged vacuum tube having a larger diameter, as well as two likewise not represented seals for the sealing of the thermal insulation area 5 between the vacuum tubes, a vacuum is generated. The vacuum serves as thermal insulator.

The windings 4 are each supplied with electrical energy, via a separate and likewise arranged in the thermal insulator power output stage 6. Controlling devices 7 are respectively integrated in the power output stages 6.

The power output stages 6 are, via merely two electrical feed lines 8, connected with a not-represented DC-voltage intermediate circuit. The feed lines 8 are guided, via a schematically represented sealing vacuum feed-through 9, through the walls one of seals.

Through the particularly close arrangement of the power output stages to the superconducting windings 4, power supply line lengths of superconducting electrical connections 10 of the windings can be formed to be particularly short with the respective power output stages 6.

In the representation, individual elements among multiple similar elements are identified with one reference character in an exemplary manner.

Figure 2:
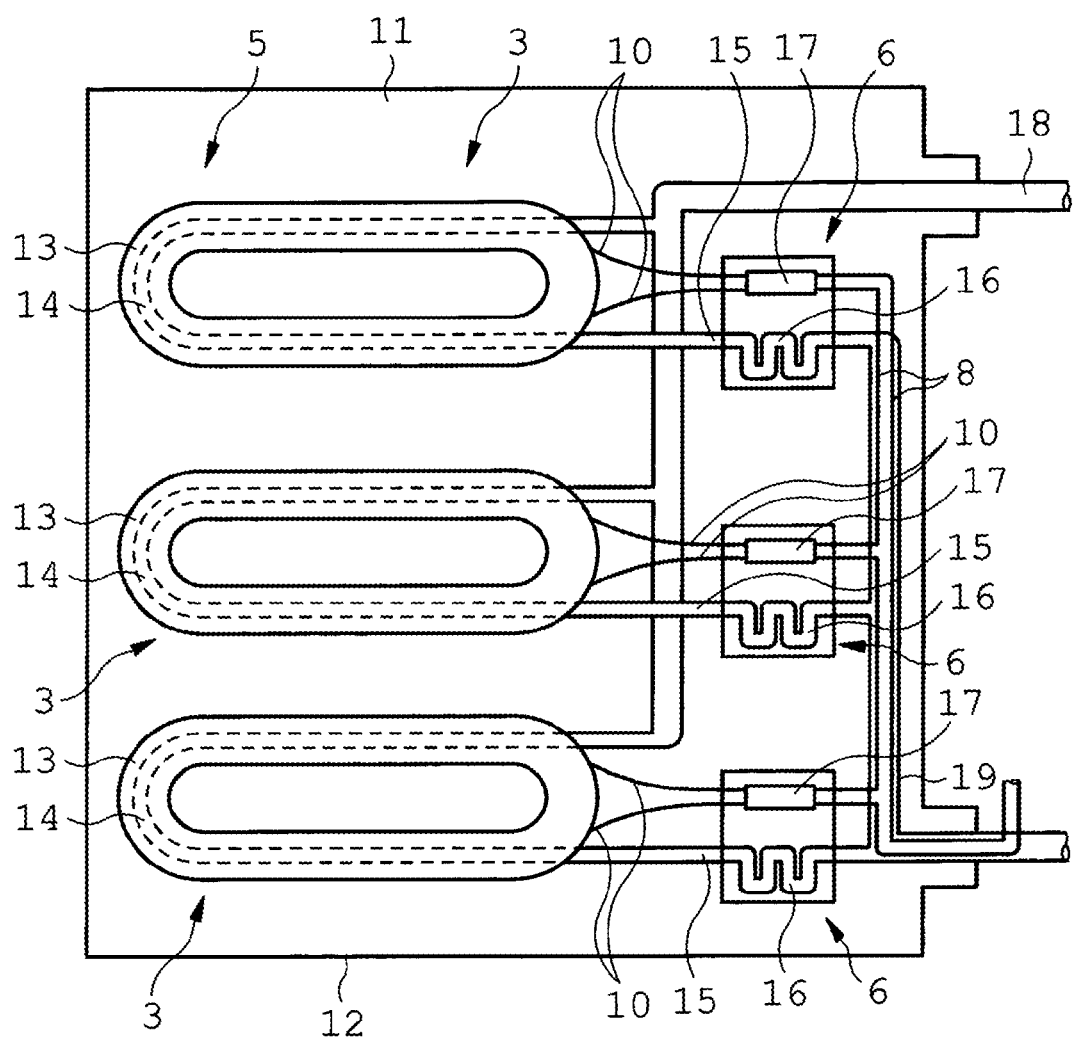

In FIG. 2, multiple machine coils 3, arranged within a thermal insulator 11 forming a thermal insulation area 5, and power output stages 6, likewise arranged within the thermal insulator 11 are shown. The thermal insulator 11 concerns a technical vacuum generated within a vacuum chamber 12.

Windings 13 of the machine coils 3 are configured toroidally, and are cooled by cooling pipes 14 resting against the windings 13 through which cryogenic fluid flows. Return lines or cooling medium connecting lines 15 of the cooling pipes 14 are each connected with heat exchangers of the power output stages 6, via which power electronics elements 17 of the power end stages 6 are cooled, wherein a cooling temperature of the windings 13 is lower than a cooling temperature of the power end stages 6.

The cryogenic fluid flows via a cooling medium feeding line 18 into the cooling pipes 13. From the cooling pipes 13, the cryogenic fluid flows, via the return lines 15, into the heat exchangers 16, and back from the heat exchanges 16 via a cooling medium return feed line 19. The cooling medium feeding line 18 and the cooling medium return feed line 19 are guided vacuum-tightly through the vacuum chamber 12.

The power output stages 6 are connected, via electrical feed lines 8, with a not-represented DC-voltage intermediate circuit. The electrical feed lines 8 are guided out of the vacuum chamber 12 via the cooling medium return feed line 18 so that no additional vacuum-tight feed-through for the electrical feed lines 8 must be provided.

Figure 3:
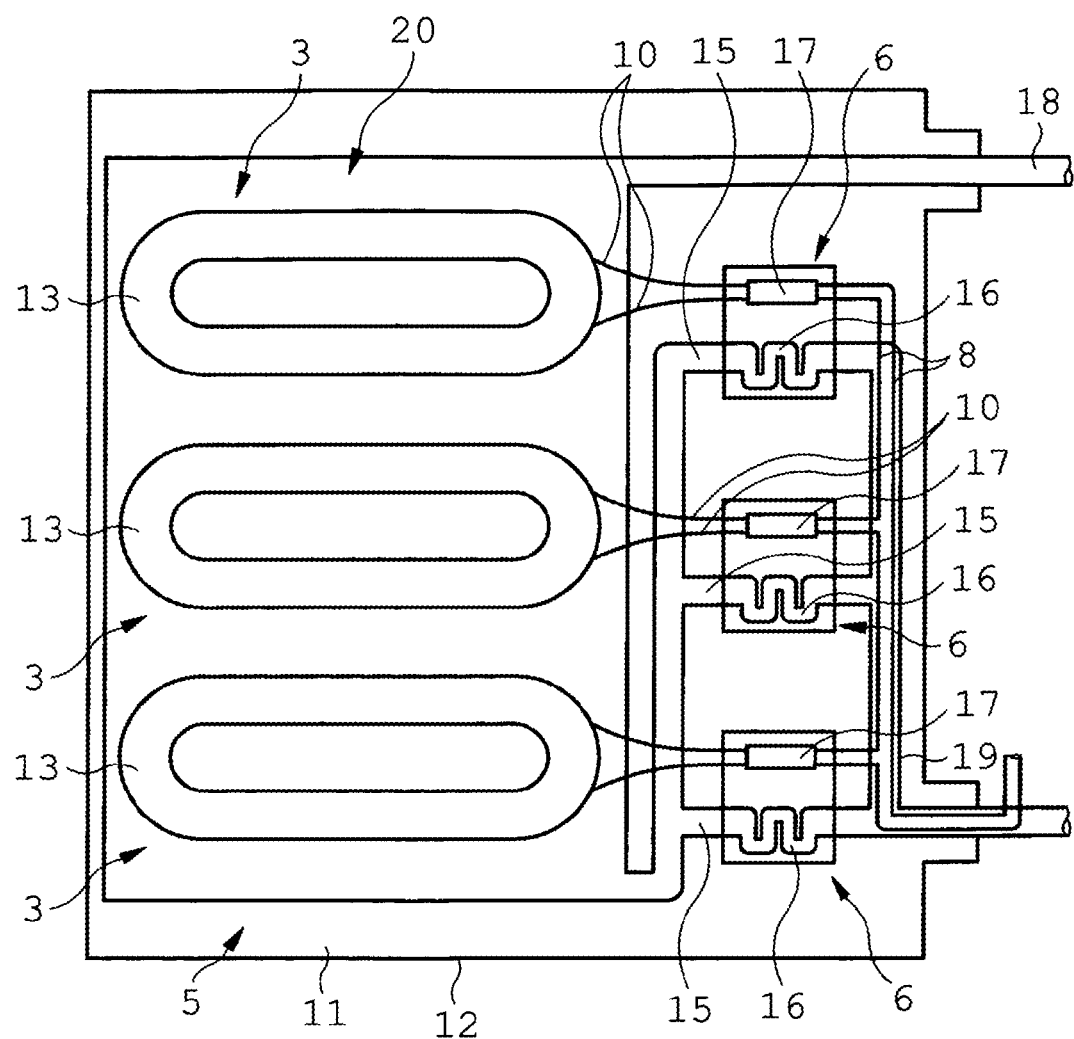

FIG. 3 schematically shows multiple machine coils 3 arranged within a refrigeration space 20 surrounded by a thermal insulator 11. In contrast to the arrangement represented in FIG. 2, the machine coils 3 or windings 13, in this exemplary embodiment, are directly flowed around and cooled by the cryogenic fluid in the refrigeration space 20. For this purpose, the windings 13 are not arranged within the thermal insulator 11 or the thermal insulation area 5, but rather in a refrigeration space 20 surrounded by the thermal insulator 11 or the thermal insulation area 5. The remaining construction corresponds to the construction represented and described in FIG. 2.

The invention claimed is:

1. An electric machine with a stator (1), with a rotor and with multiple machine coils (3), wherein the electric machine comprises a cooling device, which is suitable for cooling a superconducting material to at least below a transition temperature, wherein windings (4, 13) of at least two machine coils (3) consist of the superconducting material, and are assigned to different winding groups, wherein the windings (4, 13) are in operative connection with the cooling device, in order to cool the windings (4, 13) to below the transition temperature, and wherein the electric machine comprises an open-loop or closed-loop controlled power supply device, electrically conductively connected with the windings (4, 13), for the supply of electrical power and controlling of the machine coils (3), and wherein at least two winding groups are each electrically conductively connected with a separate, open-loop or closed-loop controlled power output stage (6) of the power supply device.

2. The electric machine according to claim 1, wherein the separate, open-loop or closed-loop controlled power output stages (6) are arranged within a thermal insulation area (5) of the electric machine formed by a thermal insulator (11).

3. The electric machine according to claim 2, wherein one or multiple control device(s) (7) for open-loop or closed-loop control of the power output stage (6) or the power output stages (6) is/are arranged within the thermal insulation area (5).

4. The electric machine according to claim 2, wherein the at least one machine coil (3), or at least the winding (4, 13) of the at least one machine coil (3) is arranged within the thermal insulation area (5) formed by the thermal insulator (11).

5. The electric machine according to claim 4, wherein the at least one machine coil (3), or at least the winding (4, 13) of the at least one machine coil (3), is cooled via at least one refrigerant-carrying cooling pipe (14) resting against the winding (4, 13).

6. The electric machine according to claim 2, wherein the at least one machine coil (3), or at least the winding (4, 13) of the at least one machine coil (3), is arranged within a refrigeration space (20), wherein the thermal insulator (11) surrounds the refrigeration space (20).

7. The electric machine according to claim 6, wherein the at least one machine coil (3), or at least the winding (4, 13) of the least one machine coil (3), are cooled via at least one bath cryostat, or through at least one refrigerator cryostat, wherein the at least one machine coil (3), or at least the winding (4, 13) of the at least one machine coil (3), is arranged within the refrigeration space (20) of the bath cryostat or the refrigerator cryostat.

8. The electric machine according to claim 2, wherein a vacuum can be generated within the thermal insulation area (5).

9. The electric machine according to claim 1, wherein the power output stage (6) or the power output stages (6) are connected with the cooling device, and can be cooled to a predetermined operating temperature between an ambient temperature of the electric machine and the transition temperature.

10. The electric machine according to claim 9, wherein the power output stage (6) or the power output stages (6) are each connected, with cooling pipes (14) of the windings (4, 13) via cooling medium connecting lines (15), wherein cooling medium is guided to the cooling pipes (14) of the windings (4, 13) from the cooling device, and the cooling medium is subsequently guided to the power output stage (6) or to the power output stages (6) via the cooling medium connecting lines (15).

11. An electric machine with a stator (1), with a rotor, and with multiple machine coils (3), wherein the electric machine comprises a cooling device, which is suitable for cooling a superconducting material to at least below a transition temperature, wherein a winding (4, 13) of at least one machine coil (3) consists of the superconducting material, wherein the winding (4, 13) is in operative connection with the cooling device, in order to cool the winding (4, 13) to below the transition temperature, and wherein the electric machine comprises an open-loop or closed-loop controlled power supply device, electrically conductively connected with the winding (4, 13), for the supply of electrical power and controlling of the machine coil (3), characterized in that an open-loop or closed-loop controlled power output stage (6) of the power supply device is arranged within a thermal insulation area (5) of the electrical machine formed by a thermal insulator (11), and is electrically-conductively connected with the winding (4, 13) of the at least one machine coil (3).

12. The electric machine according to claim 11, wherein one or multiple control device(s) (7) for open-loop or closed-loop control of the power output stage (6) or the power output stages (6) is/are arranged within the thermal insulation area (5).

13. The electric machine according to claim 11, wherein the at least one machine coil (3), or at least the winding (4, 13) of the at least one machine coil (3) is arranged within the thermal insulation area (5) formed by the thermal insulator (11).

14. The electric machine according to claim 13, wherein the at least one machine coil (3), or at least the winding (4, 13) of the at least one machine coil (3), is cooled via at least one refrigerant-carrying cooling pipe (14) resting against the winding (4, 13).

15. The electric machine according to claim 11, wherein the at least one machine coil (3), or at least the winding (4, 13) of the at least one machine coil (3), is arranged within a refrigeration space (20), wherein the thermal insulator (11) surrounds the refrigeration space (20).

16. The electric machine according to claim 15, wherein the at least one machine coil (3), or at least the winding (4, 13) of the least one machine coil (3), are cooled via at least one bath cryostat, or through at least one refrigerator cryostat, wherein the at least one machine coil (3), or at least the winding (4, 13) of the at least one machine coil (3), is arranged within the refrigeration space (20) of the bath cryostat or the refrigerator cryostat.

17. The electric machine according to claim 11, wherein a vacuum can be generated within the thermal insulation area (5).

18. The electric machine according to claim 11, wherein the power output stage (6) or the power output stages (6) are connected with the cooling device, and can be cooled to a predetermined operating temperature between an ambient temperature of the electric machine and the transition temperature.

19. The electric machine according to claim 18, wherein the power output stage (6) or the power output stages (6) are each connected, with cooling pipes (14) of the windings (4, 13) via cooling medium connecting lines (15), wherein cooling medium is guided to the cooling pipes (14) of the windings (4, 13) from the cooling device, and the cooling medium is subsequently guided to the power output stage (6) or to the power output stages (6) via the cooling medium connecting lines (15).

* * * * *